(12) United States Patent
Bodin

(10) Patent No.: US 6,387,027 B1
(45) Date of Patent: May 14, 2002

(54) METHOD AND DEVICE IN A MOBILE STATION FOR AVOIDING REPEATED REGISTRATION

(75) Inventor: Stig Roland Bodin, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/187,597

(22) Filed: Nov. 6, 1998

(30) Foreign Application Priority Data

Nov. 7, 1997 (SE) .............................................. 9704085

(51) Int. Cl.$^7$ ................................................. H04Q 7/20
(52) U.S. Cl. ..................... 485/419; 455/432; 455/435; 455/436; 455/517; 455/552
(58) Field of Search ........................... 455/31–33, 31.1, 455/32.1, 33.1, 33.2, 33.3, 33.4, 558, 557, 435, 434, 551, 552, 432, 419, 436, 517, 418, 422, 424, 425, 515, 560, 466, 414

(56) References Cited

U.S. PATENT DOCUMENTS

| | | | | |
|---|---|---|---|---|
| 4,916,728 A | * | 4/1990 | Blair | 379/59 |
| 5,020,091 A | * | 5/1991 | Krolopp et al. | 379/58 |
| 5,101,500 A | * | 3/1992 | Marui | 455/33 |
| 5,159,625 A | * | 10/1992 | Zicker | 379/59 |
| 5,428,666 A | * | 6/1995 | Fyfe et al. | 379/58 |
| 5,442,806 A | * | 8/1995 | Barber et al. | 455/33.1 |
| 5,610,919 A | * | 3/1997 | Willard et al. | 370/336 |
| 5,613,204 A | * | 3/1997 | Haberman et al. | 455/33.2 |
| 5,642,398 A | * | 6/1997 | Tiedemann, Jr. et al. | 379/57 |
| 5,675,628 A | * | 10/1997 | Hokkanen | 379/58 |
| 5,742,910 A | * | 4/1998 | Gallant et al. | 455/550 |
| 5,761,618 A | * | 6/1998 | Lynch et al. | 455/419 |
| 5,765,105 A | * | 6/1998 | Kuriki | 455/410 |
| 5,784,693 A | * | 7/1998 | Barber et al. | 455/434 |
| 5,787,347 A | * | 7/1998 | Yu et al. | 455/440 |
| 5,838,780 A | * | 11/1998 | Nagao | 379/213 |
| 5,884,168 A | * | 3/1999 | Kolev et al. | 455/432 |
| 5,905,955 A | * | 5/1999 | Bamburak et al. | 455/434 |
| 5,915,225 A | * | 6/1999 | Mills | 455/558 |
| 5,933,785 A | * | 8/1999 | Tayloe | 455/558 |
| 5,950,130 A | * | 9/1999 | Coursey | 455/432 |
| 5,999,811 A | * | 12/1999 | Molne | 455/432 |
| 6,014,561 A | * | 1/2000 | Molne | 455/419 |
| 6,178,326 B1 | * | 1/2000 | Kalliokulju | 455/437 |
| 6,044,265 A | * | 3/2000 | Roach, Jr. | 455/419 |
| 6,047,180 A | * | 4/2000 | Coutant | 455/434 |
| 6,073,016 A | * | 6/2000 | Hulthen et al. | 455/435 |
| 6,085,085 A | * | 7/2000 | Blakeney, II et al. | 455/426 |
| 6,119,000 A | * | 9/2000 | Stephenson et al. | 455/432 |

FOREIGN PATENT DOCUMENTS

| | | |
|---|---|---|
| WO | 97/15162 | 4/1997 |
| WO | 97/49232 | 12/1997 |

* cited by examiner

*Primary Examiner*—Daniel Hunter
*Assistant Examiner*—Pablo Tran
(74) *Attorney, Agent, or Firm*—Burns, Doane, Swecker & Mathis L.L.P.

(57) ABSTRACT

A method and device avoid repeated registration attempts to register on PLMNs which do not allow registration for a mobile terminal while permitting attempts to register on PLMNs earlier inserted in a list of a number of identities of rejected PLMNs in a storage in the terminal but which may allow registration at a later time. At least a part of the list is erasable to be erased from time to time. Surplus identities of rejected PLMNs on a non-volatile part of the list are transferred to the erasable part of the list at overflow of the non-erasable list.

18 Claims, 1 Drawing Sheet

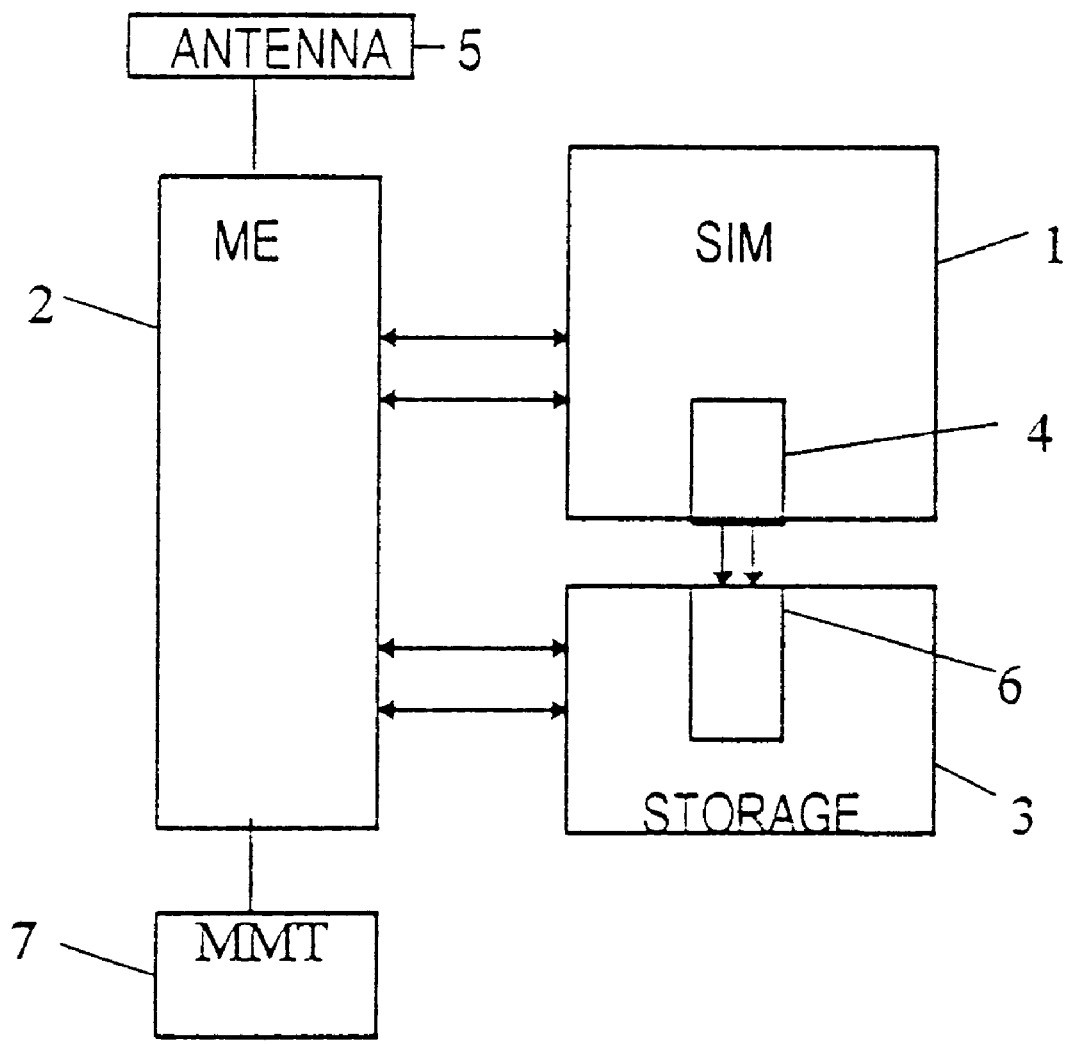
FIGURE

METHOD AND DEVICE IN A MOBILE STATION FOR AVOIDING REPEATED REGISTRATION

This application claims priority under 35 U.S.C. §§ 119 and/or 365 to 9704085-1 filed in Sweden on Nov. 7, 1997; the entire content of which is hereby incorporated by reference.

This invention relates to a method and device for registering PLMNs, and relates particularly to a method and device for enhancing the list of rejected PLMNs.

BACKGROUND

A Public Land Mobile Network (PLMN) is a geographic area served by a network operator and is defined as the area in which an operator offers radio coverage and possibility to access the network A number of PLMNs are operated by different companies. The mobile terminal can be moved around, i.e. roaming, in the area which is covered by the home PLMN to which the terminal belongs. Roaming to a visited PLMN is not allowed unless the operators of the visited PLMN and the home PLMN have made agreements on that account. If roaming is not allowed the mobile station is rejected from the visited PLMN. To prevent mobile stations from making repeated attempts to register on PLMNs where roaming is not allowed, the GSM specifications have defined a specific handling when a "roaming rejection" is received from a visited PLMN.

Each GSM mobile terminal is provided with a SIM card (SIM=Subscriber Identity Module) which identifies the set. The SIM card belongs to the telephone subscription. It can be used in any GSM terminal. The charge for the subscription is connected to the SIM card The specifications define that the SIM card shall contain a list that may contain up to four PLMN identities in a non-volatile memory. When a roaming rejection is received from a PLMN, the identity of that visited PLMN is Written into the list. If the list already has four PLMN identities, the oldest is removed from the list. The processor in the mobile equipment (ME), the terminal, will not automatically make registrations on PLMNs provided in the list in the SIM card. The size of the list was chosen to suit the situation for GSM (Global System for Mobile Communication) operating at the 900 MHz frequency range and DCS (Digital Cellular System) operating at the 1800 MHz frequency range where two or three operators were operating in each frequency band in each country.

In a situation where five of more PLMNs not allowing registration exist, and the home PLMN or a visited PLMN which could allow registration does not exist, or is received with a very low signal, so that the terminal will not lock to it or rather lock to a PLMN having stronger signals, the reaction of the mobile terminal is to cyclically attempt registration on networks that reject the mobile terminal. The reason for this behaviour is that the oldest failed visited PLMN has been removed from the list when a new non-allowable PLMN is inserted in the list and hence then has become available for attempts to registration again. The result is that no service is given to the user, and that registration load on the networks as well as power consumption in the mobile terminal are increased. Situations when more than to PLMNs which do not allow registration are more likely to occur when dual band mobile terminals covering both the 900 Mhz and the 1800 MHz frequency band are introduced A natural solution to the problem stated above could be to increase the size of the non-volatile list on the SIM. However, this requires that the SIMS are modified or replaced. Another disadvantage with a large list is that an "old" rejection from a network is unlikely to be overwritten and the PLMN allowed to be automatically attempted again. For those users who use the automatic PLMN selection method in the mobile equipment, the networks on the list will not be available for service even if the subscriber/roaming arrangements have been changed so that a visited PLMN has been allowed after the insertion of that visited PLMN identity on the list.

Reference to GSM specification specifying the "list of forbidden PLMNs" is specified in the following Specifications:

-TS GSM 02.11 Ch 3.2.2.4
-TS GSM 02.17 Ch 6.1
-TS GSM 03.22 Ch 3.1
-TS GSM 04.08 Ch 4.2 and 4.4
-TS GSM 11.11 Ch 10.3.16

SUMMARY

An object of the invention is to provide a system able to expand the list of non-allowable PLMNs which is provided in mobile terminals nowadays but in such a way that the problems of having a very long list are avoided.

Another object of the invention is to provide means to allow non-allowable PLMNs listed on the list to disappear from it in a simple, and preferably automatic way.

Still another object of the invention is to provide means to enhance the already existing list function without interfering with it.

Yet another object of the invention is to make the mobile terminal to insert a non-allowable PLMN, or at least attempt insertion, on the list only once at least within a certain time, thus to prevent a mobile terminal to repeatedly try to lock on PLMNs providing roaming rejection.

These objects are achieved by a method, and a device according to exemplary embodiments of the present invention.

The invention relates to a development of a method and a device for avoiding repeated registration attempts to register on PLMNs which do not allow registration for a mobile terminal and yet be able to attempt to register on PLMNs earlier inserted on a list of a number of identities of rejected PLMNs in a storage in the terminal but which may allow registration at a later time. The invention is characterized by providing at least a part of the list erasable to be erased at intervals; transferring surplus identities of rejected PLMNs on a non-volatile part of the list to the erasable part of the list.

Erasable part of the list are preferably erased when the mobile terminal is switched off. When a non-volatile list of registered PLMNs is provided on a SIM card in the mobile terminal, the erasable part of the list could be provided in a volatile storage connected to a computer in the mobile terminal. Each identity outputted from the non-volatile PLMNs card list when a new rejected PLMNs is registered could be transferred to the volatile storage list. The erasable part of the list should be erased when the SIM card is removed from the mobile terminal, when the terminal is switched off at a manual command and/or automatically according to predetermined conditions. Each automatic erasing could for instance occur a predetermined time after that the erasable list part is made writable again after an erase, whether the erase depended on a switch off or an automatic erase.

An arbitrary identity of a PLMN on the erasable part of the list could for instance be transferred to the non-erasable part of the list at manual control, i.e. erase the PLMN in question from the erasable part of the list and insert it on the non-erasable part of the list.

The additional list could be placed in the mobile equipment which means that the SIM card need not be changed. The solution according to the invention can be combined with an increase of the number of entries on the list of rejected PLMNs in the SIM card.

BRIEF DESCRIPTION OF THE DRAWINGS

For a more complete understanding of the present invention and for further objects and advantages thereof, reference is now made to the following description taken in conjunction with the accompanying drawing, in which the FIGURE illustrates an embodiment of the invention.

DETAILED DESCRIPTION

Referring to the FIGURE, a SIM card 1 is provided in the mobile station and connected to the mobile equipment ME 2 having a non-volatile storage 3. When attempts to register on a visited PLMN where roaming is not allowed, a roaming rejection is received from the visited PLMN to an antenna 5 connected to the mobile equipment. The mobile equipment then writes the identity of that visited PLMN onto a list 4 in the SIM card. The list 4 has a size for storing a predetermined number, for instance five, of rejected PLMNs. This list could for instance work as a shift register or a FIFO (First In First Out), such that the identity of the latest roaming rejection received from a visited PLMN is placed first on the list, the rest of the identities on the list is moved one step forwards and the identity last on the list is removed from the list. However, other criteria for transferring surplus identities from the non-volatile list could be adopted.

According to the invention an additional list 6, which is volatile, is provided preferably in the storage 3. The volatile list 6 functions as an extension to the non-volatile list in the SIM. The surplus identity on the SIM list 4 is transferred to the volatile list 6 when a new visited PLMN is written onto the SIM list 4 instead of being just removed.

Since the list 6 is provided in a volatile storage 3 it is automatically erased when the mobile station is switched off. This allows the mobile station one attempt on the PLMNs not in the non-volatile storage list 4 in the SIM but prevents repeated attempts.

Mobile equipment 2 operates in the following way:

The identity of each PLMN identity removed from the SIM list 4 is written onto the PLMN list 6 in the volatile storage 3, The entry in the PLMN list 6 is handled in the same way as the SIM list 4, e.g. in the same way as a shift register. If the list 6 happens to be full then a new entry of a PLMN identity pushes out the oldest one on the list, When the mobile station is switched off, or the SIM is removed from the station, the contents of the volatile list 6 is erased.

The combined list 4 and 6 has the same function as an extended SIM list as soon as the station is switched on.

As an additional option the list could be erased automatically at certain intervals. This is particularly important in a case when the station is left switched on for a long time. The batteries nowadays are very long-lived and a terminal can be left switched on to be stand-by for a long time without any inconvenience. A mobile terminal could naturally also be connected to the mains. It is important that the extension of the rejection list 3 and 6 on the list 6 is erased now and then in order not to prevent use of visited PLMNs when they are allowed to be used by the mobile station in question. These intervals could be predetermined, chosen at will by the user through a suitable MMI (Man Machine Interface) 7 at the mobile terminal, or arbitrary. Suitable erasing intervals could be from a day to some weeks.

Some times the user will manually force an update on a PLMN included in the list of non-allowed PLMNs, e.g. to check if the service is available. Thus, it is allowed to force the list when the mobile terminal is in manual mode. The user is in fact not interested in the actual list, he/she just wants to register on an allowed network. This intention by the user makes it necessary to provide an opportunity to insert a non-allowable PLMN on the non-volatile part of the list, i.e. on the part 4 of the list on the SIM card, even if the actual non-allowable PLMN identity is already inserted on the list, whether it is on the non-volatile or the volatile part of it.

According to an additional possibility, if a rejection is received from a visited PLMN which identity already is provided on the additional list 6, the user by operating a particular code on the MMI 7 could control the mobile equipment to erase that visited PLMN from the part of the list 6 and thus include entry of the identity of that visited PLMN on the non-volatile SIM list 4.

There could also be a possibility to transfer an arbitrary visited PLMN on the volatile part of the list to the non-volatile part 4 of the list when this is desired When the non-volatile part of the list is provided on a SIM card the visited PLMN is inserted first on the SIM card list, and the PLMN oldest on that list is outputted and transferred to the volatile part 6 of the list. The PLMN transferred to be first on the SIM card list 4 is erased from the volatile storage list 6.

Another possibility to insert a rejected PLMN into the SIM card list could be by remote control for instance from the system operator. In such a case the PLMN in question is first erased from the list, if it is already on it, and then it is inserted to be first on the list.

The features according to the invention mentioned above are provided simply by adding a program loop in the computer program controlling the mobile equipment. The new program comprising the program loop could easily be substituted for the old program in terminals already on the market. The SIM card which can be placed in different terminals need not be amended in any way.

While the invention has been described with reference to specific embodiments, it will be understood by those skilled in the art that various chances may be made and equivalents may be substituted for elements thereof without departing from the true spirit and scope of the invention as it is defined in the accompanying claims. For example, the non-volatile list need not be provided on a SIM card but in a storage of the mobile equipment. Thus, the invention is not restricted to the use of SIM card. The list need not be designed as a FIFO but can output PLMNs on the list in another determined order.

I claim:

1. A method for avoiding repeated attempts to register on PLMNs which do not allow registration for a mobile terminal while permitting attempts to register on PLMNs earlier inserted on a list of a number of identities of rejected PLMNs in a storage in the terminal but which may allow registration at a later time, the method comprising:

providing at least a part of the list which is erasable to be erased from time to time;

transferring surplus identities of rejected PLMNs on a non-erasable part of the list to the erasable part of the list;

inserting an arbitrary identity of a rejected PLMN onto the non-erasable part of the list at control; and erasing the arbitrary identity on another part of the list if the arbitrary identity is already on the list.

2. The method according to claim 1, wherein the erasable part of the list is erased when the mobile terminal is switched off.

3. The method according to claim 1, wherein when the list of PLMNs is stored in non-volatile storage, the method further comprises the steps of:

creating the erasable part of the list in a volatile storage connected to a computer in the mobile terminal; and transferring onto the erasable part of the list each identity outputted from the non-volatile SIM card list when a new rejected PLMN is inserted onto the SIM card list.

4. The method according to claim 3, wherein the erasable part of the list is erased when the SIM card is removed from the mobile terminal.

5. The method according to claim 1, further comprising the step of automatically erasing the erasable list part at one of a predetermined and an arbitrary interval.

6. The method according to claim 5, wherein each automatic erasing occurs at a predetermined time after which the erasable list part is made writable again, wherein the erasure depends on one of a switch off, a removal of a SIM card, and an automatic erase.

7. A device for avoiding repeated attempts to register on PLMNs which do not allow registration for a mobile terminal while permitting attempts to register on PLMNs earlier inserted in a list of a number of identities of rejected PLMNs in a storage in the terminal but which may allow registration at a later time, wherein the list comprises:

a non-volatile list part, into which the identities of rejected PLMNs are written; and a volatile list part, into which one of the identities on the non-volatile list part is transferred if the non-volatile list part is full, the transfer occurring as soon as a new identity is written into the non-volatile list part; and wherein the device comprises:

means for inserting an arbitrary identity of a rejected PLMN onto the non-volatile list part at control; and means for erasing the arbitrary identity on another list part if the arbitrary identity is already on the list.

8. The device according to claim 7, comprising means for erasing the volatile list part, wherein the erasing means erases at at least one of an interval of time, a switching off the mobile terminal, and the removing of a SIM card.

9. The device according to claim 7, comprising a SIM card having the non-volatile list part, wherein the volatile list part is in a storage belonging to a computer in the mobile station.

10. A method for avoiding repeated attempts by a mobile terminal to register on Public Land Mobile Networks (PLMNs), the method comprising the steps of:

providing a list of a number of identities of rejected PLMNs, wherein at least a part of the list is erased from time to time;

attempting to register on a PLMN that is not on the list;

if the attempt to register is unsuccessful, then adding the identity of the rejected PLMN onto the part of the list that is not erased from time to time; and if the part of the list that is not erased from time to time is full, then transferring surplus identities of rejected PLMNs from the part of the list that is not erased from time to time to the part of the list that is erased from time to time.

11. The method of claim 10, further comprising the step of erasing the part of the list that is erased from time to time when a Subscriber Identity Module is removed from the mobile terminal.

12. The method of claim 10, further comprising the step of erasing the part of the list that is erased from time to time when the mobile terminal is switched off.

13. The method of claim 10, further comprising the steps of:

inserting an arbitrary identity of a rejected PLMN onto the part of the list that is erased from time to time; and erasing the arbitrary identity on another part of the list if the arbitrary identity is already on the list.

14. The method of claim 10, further comprising the step of automatically erasing the part of the list that is erased from time to time at one of a predetermined interval and an arbitrary interval.

15. A device for avoiding repeated attempts by a mobile terminal to register on Public Land Mobile Networks (PLMNs), comprising:

a list of a number of identities of rejected PLMNs, wherein at least a part of the list is erased from time to time;

means for attempting to register on a PLMN that is not on the list;

means for adding the identity of the rejected PLMN onto the part of the list that is not erased from time to time; and means for transferring surplus identities of rejected PLMNs from the part of the list that is not erased from time to time to the part of the list that is erased from time to time.

16. The device of claim 15, further comprising means for erasing the part of the list that is erased from time to time.

17. The device of claim 16, wherein the erasing means erases at at least one of an interval of time, a switching off of the mobile terminal, and a removal of a Subscriber Identity Module.

18. The device of claim 15, wherein the part of the list that is not erased from time to time is stored on a Subscriber Identity Module.

\* \* \* \* \*